United States Patent [19]

Troltsch et al.

[11] Patent Number: 5,137,125
[45] Date of Patent: Aug. 11, 1992

[54] PRESSURE-ACTUATED VALVE

[75] Inventors: Karl Troltsch, Schwieberdingen;
Rolf Gawlik, Beilstein; Bernd Taubitz, Schwieberdingen; Roland Weisser, Unterkirnach, all of Fed. Rep. of Germany

[73] Assignee: Robert Bosch GmbH, Stuttgart, Fed. Rep. of Germany

[21] Appl. No.: 630,617

[22] Filed: Dec. 20, 1990

[30] Foreign Application Priority Data

Dec. 22, 1989 [DE] Fed. Rep. of Germany ....... 3942545

[51] Int. Cl.$^5$ .............................................. F16B 13/02
[52] U.S. Cl. ..................... 188/282; 188/299; 188/322.15
[58] Field of Search ............. 188/285, 280, 282, 288, 188/289, 299, 275, 322.15

[56] References Cited

U.S. PATENT DOCUMENTS

| | | | |
|---|---|---|---|
| 3,034,605 | 5/1962 | Pernini | 188/288 |
| 4,401,196 | 8/1983 | Grundel | 188/322.15 |
| 4,696,379 | 9/1987 | Yamamoto et al. | 188/299 |
| 4,834,223 | 5/1989 | Kawamura et al. | 188/289 |
| 4,893,699 | 1/1990 | Engelsdorf et al. | 188/299 |
| 4,946,009 | 8/1990 | Knutson | 188/299 |
| 4,972,929 | 11/1990 | Ivers et al. | 188/282 |

FOREIGN PATENT DOCUMENTS

| | | | |
|---|---|---|---|
| 0198180 | 10/1986 | European Pat. Off. | 188/322.15 |
| 0328843 | 8/1989 | European Pat. Off. | |
| 3800864 | 10/1988 | Fed. Rep. of Germany | |
| 0163344 | 12/1980 | Japan | 188/282 |

OTHER PUBLICATIONS

E. M. Chaimowitsch, "Öhydraulik, Grundlagen und Anwendung", 5. Ed., 1963, p. 200.
H. G. Conway "Fluid Pressure Mechanisms", 7959, pp. 96–99.
W. Backe, "Grundlagen der Ölhydraulik", 4. Edition, 1979, pp. 235–239.

*Primary Examiner*—Matthew C. Graham
*Attorney, Agent, or Firm*—Edwin E. Greigg; Ronald E. Greigg

[57] ABSTRACT

A pressure-actuated valve which includes an effective pressure face by which the valve is opened, the face on which the pressure difference that opens the valve acts is completely independent of an openable flow opening. The effective pressure face and the openable flow opening can be selected arbitrarily within wide limits, independently of one another. The pressure-actuated valve according to the invention is preferably suitable for shock absorbers.

14 Claims, 7 Drawing Sheets

PRESSURE-ACTUATED VALVE

BACKGROUND OF THE INVENTION

The invention relates to a pressure-actuated valve as set forth herein. The pressure-actuated valve includes a valve body that is actuated in the closing direction toward a valve seat by a spring element. Once the valve body is seated on its valve seat, a flow opening is closed, and a chamber containing pressure on the inflow side is separated from a chamber containing pressure on the outflow side.

Depending on the pressure difference between that on the inflow side and that on the outflow side, the valve body can close the flow opening; that is, the valve body covers the flow opening. The pressure on the inflow side acts upon the valve body in the region of the flow opening. The part of the valve body that covers the flow opening represents an effective pressure face for the inflow-side pressure. If the inflow-side pressure attains a certain value, this pressure can lift the valve body from the valve seat, counter to the closing force of the spring element, and pressure fluid can flow out of the first chamber into the second chamber. If a large flow of pressure fluid from the first chamber into the second chamber is intended to be possible, without overly throttling the flow of pressure fluid in the region of the flow opening, then the flow opening must be correspondingly large. If the flow opening is large, then in order that the spring element acting upon the valve body can close the flow opening, the spring element must be dimensioned accordingly. The larger the flow opening, the stronger the spring element has to be in order to be capable of keeping the inflow-side pressure at a desired value.

In the known pressure-actuated valve, if high pressures are to be protected against, without causing excessive throttling of the flow of pressure fluid when the flows are larger, then a strong spring element is necessary, which results in a very large, massive pressure-actuated valve.

In this known valve, the pressure fluid can flow only out of one certain chamber into the other. With this sole possible flow direction, the pressure-actuated valve functions as a so-called pressure holding or pressure limiting valve or safety valve. In the known valve, a flow in the opposite direction is not possible.

OBJECT AND SUMMARY OF THE INVENTION

The pressure-actuated valve has an advantage that a high pressure can be protected against with a relatively weak and therefore small spring element, even though at the same time the flow opening can be large.

Because an intermediate pressure develops in an intermediate chamber as the pressure-actuated valve opens, the advantage is attained that as the flow of pressure fluid increases the inflow-side pressure remains more or less constant, if desired. It is even possible for the inflow-side pressure to decrease with an increasing flow of pressure fluid. This is merely a matter of dimensioning.

The pressure-actuated valve has an advantage that it can be constructed in such a way that there can be a flow through it in both directions. Advantageously, the valve can be constructed such that the pressure difference in the region of the valve is of equal magnitude for both flow directions, or depending on the dimensioning the applicable pressure difference for the two flow directions can be selected to be different.

Since only one spring element is needed to protect against an inflow-side pressure for both flow directions, the valve is very simple and small in structure.

Since the pressure-actuated valve advantageously is relatively small and light in weight, it is particularly well suited for protecting against a flow of pressure fluid that is exchanged between work chambers of a damping system, especially a shock absorber. In the shock absorber, the pressure-actuated valve can advantageously influence the damping force. It ma either be the only valve in the shock absorber, or for example it may be provided as an additional safety valve, parallel beside some other valve, for instance an electromagnetically actuatable valve. Here the pressure-actuated valve can be used so that as soon as an overly high pressure prevails in one of the work chambers, it opens a path to the other work chamber. Depending on how the pressure-actuated valve is embodied, both flow directions can be protected using only a single pressure-actuated valve.

The invention will be better understood and further objects and advantages thereof will become more apparent from the ensuing detailed description of preferred embodiments taken in conjunction with the drawings.

DESCRIPTION OF THE PREFERRED EMBODIMENTS

The pressure-actuated valve according to the invention can be used in any system in which a pressure of a pressure fluid is to be protected against, or a pressure difference between an inflow-side and an outflow-side pressure of the pressure fluid is to be protected against adjusted or controlled Although it is not restricted solely to this use, a shock absorber has been selected as an exemplary application of the pressure-actuated valve according to the invention in the exemplary embodiments of the present patent application.

Figure 1:
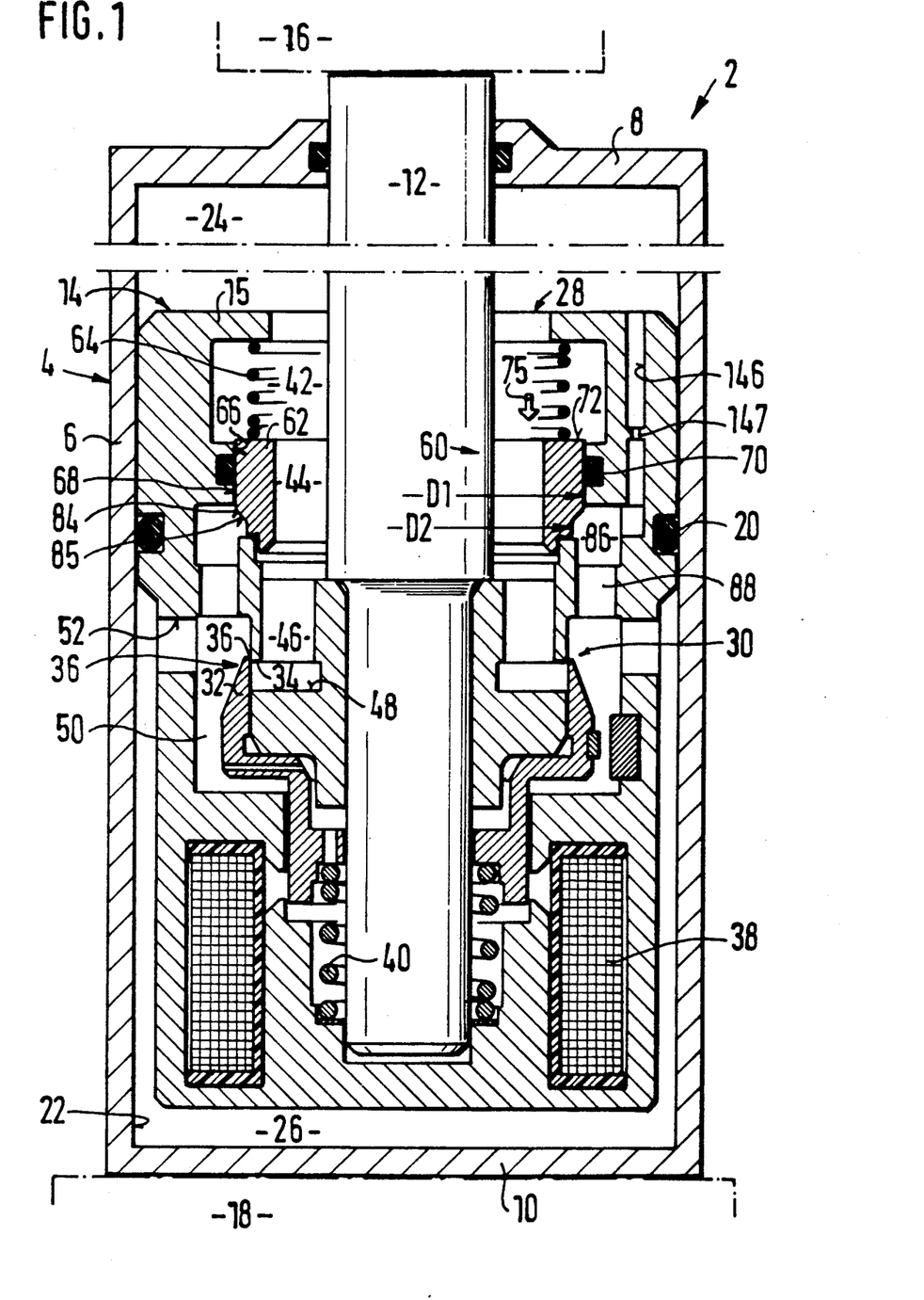
FIGS. 1-4 show different exemplary embodiments of the invention in simplified form.

FIG. 1 shows the first exemplary embodiment. A shock absorber 2 has a cylinder 4 with a jacket tube 6, shown in intermittent segments, with a first face end 8 and a second face end 10. Protruding from the first face end 8 of the jacket tube 6 is a piston rod 12. Only the two ends of the piston rod 12 are shown. The piston rod 12 is connected by one end to a stepped damper piston 14, and by another end it is pivotably connected to a first mass 16, shown by dot-dash lines. In other words, the damper piston 14 is connected to the first mass 16. The damper piston 14 includes a housing 15. The second face end 10 is connected to a second mass 18, again shown by dot-dash lines. The first mass 16 is a vehicle body, for instance, and the second mass 18 is a vehicle axle, for instance. The damper piston can slide axially along a inner jacket face 22 of the jacket tube 6, with the interposition of a guide ring 20. The guide ring 20 simultaneously acts as a seal. An interior of the cylinder 4 is divided by the damper piston 14 into a first work chamber 24 and a second work chamber 26. In the drawing the first work chamber 24 is above and the second work chamber 26 is below the damper piston 14. The work chambers 24, 26 are at least partly filled with a pressure fluid.

The two work chambers 24, 26 communicate with one another via a flow connection 28. A throttle restriction 30 is provided in the course of the flow connection 28. The throttle restriction 30 can be varied by actuating a control slide 32. There is a fixed control edge on the housing 15 of the damper piston 14. The control slide 32 is provided on its face end with a slide control edge 36. By applying current to a magnet coil 38, the control slide 32 can be actuated axially counter to the force of a spring 40 With increasing current to the magnet coil 38, the slide control edge 36 of the control slide 32 increasingly lifts away from the fixed control edge 34; that is, with increasing power to the magnet coil 38, a cross-sectional area at the throttle restriction 30 is enlarged. With no power to the magnet coil 38, the throttle restriction 30 is closed, or in other words the cross-sectional area reaches its minimum.

The flow connection 28 includes a spring chamber 42, a chamber 44, longitudinal openings 46, a plunge cut groove 48, the throttle restriction 30, a slide chamber 50 and transverse openings 52 in the piston. If the pressure in the first work chamber 24 is higher than in the second work chamber 26, then depending on the position of the control slide 32 the pressure fluid can flow through the flow connection 28 in the order of the above list. If the pressure in the second work chamber 26 is higher than in the first work chamber 24, then the pressure fluid flows through the flow connection 28 in the opposite order.

The cross-sectional area of the throttle restriction 30 determines a damping force of the shock absorber 2. If the control slide 32 is in a control position at which the cross-sectional area of the throttle restriction 30 is very small, and if at the same time one of the masses 16, 18 is moved very rapidly relatively to the other mass 16, 18, then high damping forces are created within the shock absorber 2; this means that depending on the relative motion, a very high pressure arises in one of the two work chambers 24, 26. If no further provisions are made, then the pressure in one of the work chambers 24, 26 might under some circumstances attain a magnitude that could cause failure of the shock absorber 2, or undesirably high damping forces may arise. To prevent this, the pressure-actuated valve 60 according to the invention is built into the flow connection 28 of the shock absorber 2.

The pressure-actuated valve 60 includes a valve body 62, a spring element 64, a sealing element 70 and at least one region of the housing 15 surrounding the valve body 62, the spring element 64 and the seal 70. The spring element 64 may comprise one spring or a plurality of, cooperating springs. A guide bore 6 extending approximately concentrically with the piston rod 12 is provided on the housing 15 of the damper piston 14. The valve body 62 has a very generally sleeve-like shape with an outer guide jacket 68. With its guide jacket 68, the valve body 62 is supported axially slidably in the guide bore 66 of the housing 15. To assure that no pressure fluid can flow through a gap formed between the guide jacket 68 of the valve body 62 and the guide bore 66 of the housing 15, a plunge cut groove is cut into the region of the guide bore 66, and the sealing element 70 is fitted into it.

In FIG. 1, the valve body 62 is shown cut transversely to its circumference but longitudinally of its axis, so that in FIG. 1 two sectional faces that are mirror images of one another can be seen. For the sake of clarity, one of these sectional faces is shown again in FIG. 5 on a different scale. In all the drawing figures, elements that are the same or function the same are provided with the same reference numerals.

The sleeve-like valve body 62 has a face end 72 extending into the spring chamber 42. The spring element 64 is installed in the spring chamber 42. With one end, the spring element 64 acts against the housing 15 of the damper piston 14, and with its other end it acts against the face end 72 of the valve body 62. The spring element 64 seeks to actuate the valve body 62 by a closing force in a closing direction, until the valve body 62 comes to rest on a step 74 of the housing 15 extending transversely to the closing direction. In the drawing, the closing direction is symbolized by an arrow 75. The part of the valve body 62 that comes to rest on the step 74 of the housing 15 will hereinafter be called the valve body sealing region 76. The part of the housing 15 on which the valve body sealing region 76 comes to rest will hereinafter be called the counterpart sealing region 78. The valve body sealing region 76 and the counterpart sealing region 78 in cooperation form a sealing location 80.

The guide jacket 68 of the valve body 62 has a diameter D1. The sealing location 80 between the step 74 of the housing 15 and the valve body 62 extends in the form of a circular ring and has a diameter D2 The valve body 62 has an inner bore jacket 82 with a diameter D3, extending approximately concentrically with the guide jacket 68.

Since the diameter D2 of the sealing location 80 is smaller than the diameter D1 of the guide jacket 68 of the valve body 62, a step 84 is formed between the guide jacket 68 and the sealing location 80. The step 84 on the valve body 62 extends in FIG. 5 transversely to the closing or opening direction; however, it may also extend obliquely, as shown in FIG. 1. Regardless of the course of the step 84 or of the embodiment of the valve body 62 between the guide jacket 68 and the sealing location 80, an effective pressure face 85 is obtained, from the difference in surface area obtained by subtracting the are of diameter D2 from the area of diameter D1. The effective pressure face 85 of the valve body 62 protrudes into a chamber 86. The chamber 86 communicates with the slide chamber 50 via longitudinal bores 88. Thus the pressure prevailing in the chamber 86 is the same pressure p2 as in the slide chamber 50 and, because of the transverse openings 52, in the second work chamber 26. The chamber 86 and the longitudinal bores 88 are likewise a component of the flow connection 28.

Figure 5:
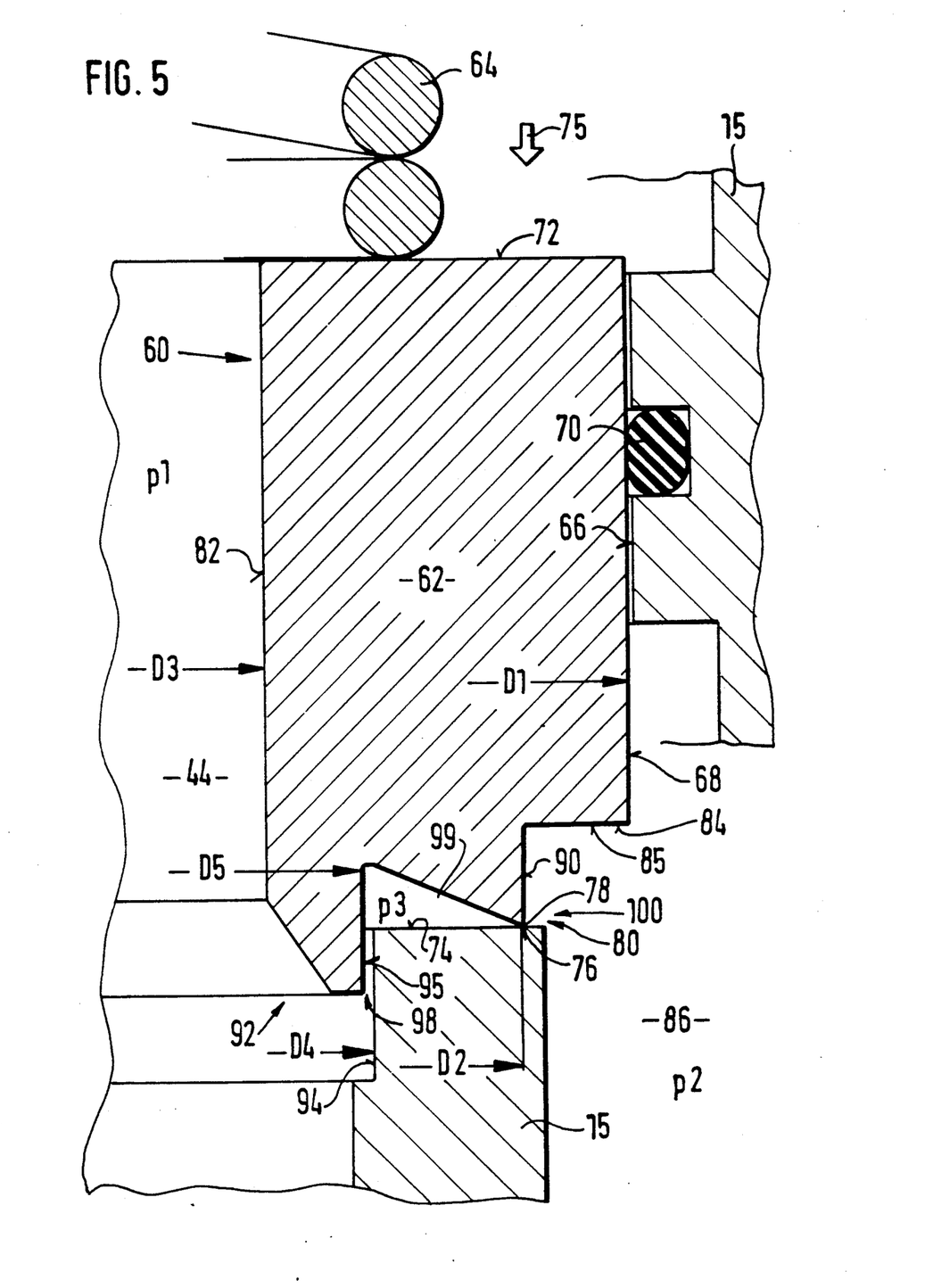
FIGS. 5-7 show special details of portions of the different embodiments shown in FIGS. 1-4.

The pressure p2 prevailing in the chamber 86 acts upon the effective pressure face 85 of the valve body 62. A cylindrical part 90 may be provided on the valve body 62 between the step 84 and the sealing location 80. Thus, the pressure prevailing in the chamber 86 can act unhindered as far as the sealing location 80, and the valve body sealing region 76 of the valve body 62 is located on the preferably edge-like end, toward the counterpart sealing region 78 of the cylindrical part 90 of the valve body 62.

The same pressure p1 as in the first work chamber 24 prevails in the spring chamber 42, the chamber 44 and the longitudinal openings 46. Depending on the direction of motion and speed of the damper piston 14 relative to the cylinder 4, the pressure p1 is higher than the pressure p2, or the pressure p1 is equal to the pressure p2, or the pressure p1 is less than the pressure p2. The pressure p1 acts on the face end 72 of the valve body 6 in the closing direction symbolized by the arrow 75. The diameter D3 of the bore jacket 82 is smaller than the diameter D2 of the sealing location 80. An annular part extending between the two diameters D2, D3 on the end of the valve body 62 remote from the face end 72 will hereinafter be called the face end 92. When the sealing location 80 is closed, the pressure p1 acts upon the entire face end 92 between D2 and D3 in the opening direction, counter to the arrow 75.

Bordering on the step 74 toward the face end of the housing 15, a cylindrical step 94 having a diameter D4 extends along the housing 15. The diameter D4 is less than the diameter D2. The face end 92 of the valve body 62 has a stepped course, among other reasons because of a cylindrical step 95 having a diameter D5. The diameter D5 is larger than the diameter D3 but smaller than the diameter D2 of the sealing location 80. The diameter D4 is slightly larger than the diameter D5. The cylindrical step 95 of the valve body 62 axially overlaps the cylindrical step 94 of the housing 15, so that a narrow annular throttle restriction 98 is formed between these two cylindrical steps 94, 95. An intermediate chamber 99 is located between the sealing location 80 and the throttle restriction 98. Since no pressure fluid flows through the throttle restriction 98 when the sealing location 80 is closed, the pressure p1 prevailing in the chamber 44 acts upon the entire face end 92 between the diameter D2 and the diameter D3 and also acts in the intermediate chamber 99 as a result.

With the sealing location 80 closed, that is, if the valve body sealing region 76 of the valve body 62 rests on the counterpart sealing region 78 of the housing 15, the following forces act in the closing direction (arrow 75) upon the valve body 62: the closing force of the spring element 64 and the closing force of the pressure p1 acting on the face end 72 of the valve body 62 between the diameter D1 and the diameter D3. The following forces act in the opening direction: the force of the pressure p2 acting on the effective pressure face 85 between the diameter D1 and the diameter D2 of the valve body 62, and the force of the pressure p1, which also acts on the face end 92 between the diameter D2 and the diameter D3 upon the valve body 62 in the opening direction (counter to the arrow 75). If the pressure difference between p1 and p2 is small, because of the closing force of the spring element 64, the sealing location 80 is closed. With increasing pressure p2 in the chamber 86, the force in the opening direction (counter to the arrow 75) becomes increasingly stronger, or with decreasing pressure p1 in the chamber 44, the sum of the closing forces becomes increasingly smaller. Beyond a predetermined pressure difference between the pressure p2 and the pressure p1, the valve body sealing region 76 lifts away from the counterpart sealing region 78, and a flow opening 100 opens up between the valve body sealing region 76 of the valve body 62 and the counterpart sealing region 78 of the housing 15. Now pressure fluid can flow out of the chamber 86 through the flow opening 100 in the direction of the chamber 44. Since the pressure fluid flows out of the chamber 86 into the chamber 44 at the pressure p2, in this case the pressure p2 can also be called the inflow-side pressure. The other pressure at a given time, in this case the pressure p1 in the chamber 44, can be designated the outflow-side pressure. Upon flowing out of the chamber 86 into the chamber 44, the pressure fluid is throttled once again in the region of the throttle restriction 98, so that an intermediate pressure p3 forms in the region between the diameter D2 and the diameter D5, that is, in the intermediate chamber 99; depending on the size of the flow opening 100 and of the throttle restriction 98, this pressure p3 is in the range between the pressure p2 and the pressure p1. Particularly as a function of the overlap between the step 95 of the valve body 62 and the step 94 of the housing 15, the intermediate pressure p3 can be virtually of equal magnitude to the inflow-side pressure, especially if the valve 60 is widely opened. Since the intermediate pressure p3 is higher than the pressure p1, as soon as a certain flow area 100 has opened in the region of the sealing location 80, the valve body 62 is forced to an increased extent in the opening direction (counter to the arrow 75), and as a result a very large flow opening 100 can advantageously form immediately. Even if upon actuation of the valve body 62 in the opening direction (counter to the arrow 75) the force of the spring element 64 increases, this can be largely compensated for by the intermediate pressure p3, or even overcompensated for, depending on the design of the construction. If the diameters are suitably selected from a construction standpoint, the pressure-actuated valve 60 may be embodied such that the pressure difference between the pressure p2 and the pressure p1 remains largely constant despite the magnitude of the flow of pressure fluid flowing through it.

Figure 2:
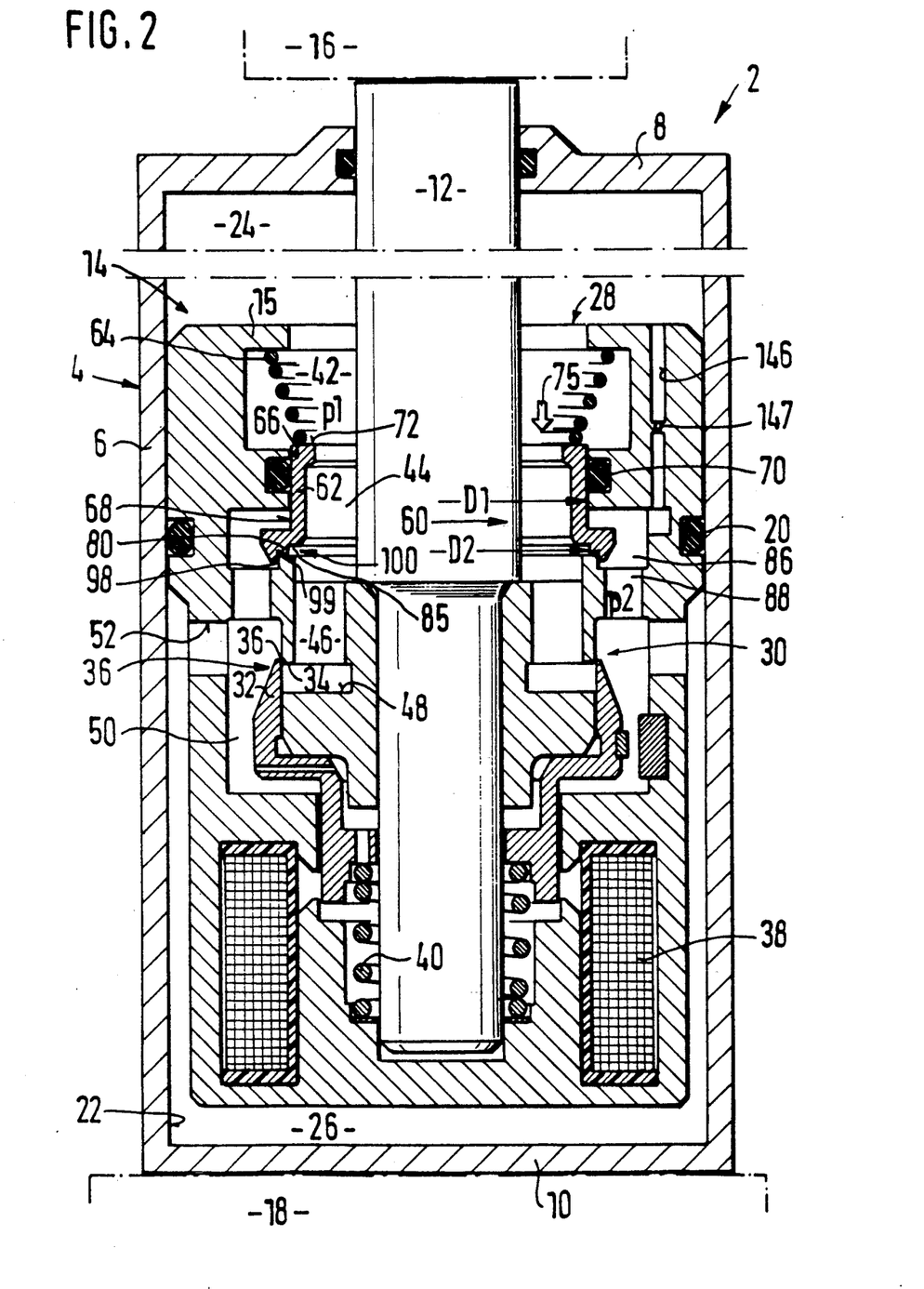

In the first exemplary embodiment of FIG. 1, if the pressure p2 in the chamber 86 is higher than the pressure p1 in the chamber 44 and if the pressure difference attains a predetermined value, then the flow opening 100 of the pressure-actuated valve 60 opens. However, if the pressure p1 in the chamber 44 is higher than the pressure p2 in the chamber 86, then the pressure-actuated valve 60 remains closed, regardless of the pressure difference. However, it is also possible to embody the pressure-actuated valve 60 such that it opens when the pressure p1 in the chamber 44 is higher than the pressure p2 in the chamber 86. FIG. 2 shows an exemplary embodiment of that.

FIG. 2 shows the second exemplary embodiment. Here the diameter D2 of the sealing location 80 is greater than the diameter D1 of the guide jacket 68 of the valve body 62. The pressure-actuated valve 60 shown here therefore opens its flow opening 100 whenever the pressure p1 in the chamber 44 is sufficiently higher than the pressure p2 in the chamber 86, and the pressure fluid can flow out of the chamber 44 in the direction of the chamber 86. Then the pressure p1 in the chamber 44 can be called the inflow-side pressure. In this exemplary embodiment as well, the sealing location 80 is adjoined in the flow direction by the intermediate chamber 99 and then by the throttle restriction 98, before the pressure fluid reaches the chamber 86. Thus the pressure-actuated valve 60 of the second exemplary embodiment can likewise keep the pressure p1 in the chamber 44 constant, regardless of the magnitude of the flow of pressure fluid flowing through it, and logically can do so in the same way as described for the first exemplary embodiment of FIG. 1. One skilled in the art can readily apply further details of the first exemplary embodiment, mentioned in conjunction with FIGS. 1 and 5, to the second exemplary embodiment of FIG. 2.

If one of the pressure-actuated valves 60 described in terms of the first two exemplary embodiments is built into the shock absorber 2, then either the pressure p1 in the chamber 44 (that is, in the first work chamber 24) or the pressure p2 in the chamber 86 (that is, in the second work chamber 26) can be limited to a maximum value. If the pressures p1, p2 in both work chambers 24, 26 are to be limited with the pressure-actuated valve 60, then two of the valves 60 shown in FIGS. 1 and 2 should be installed in the flow connection 28 of the shock absorber 2. Since the pressure-actuated valves 60 are relatively small in size, and since the required spring element 64 ca be relatively weak and thus small in size, it is often possible without any difficulty to install two pressure-actuated valves 60 in the shock absorber 2. The variants of the pressure-actuated valve 60 described below in terms of two further exemplary embodiments offer the advantage that with a single pressure-actuated valve 60, both the pressure p1 in the first work chamber 24 and the pressure p2 in the second work chamber 26 can be limited. In exemplary embodiments three and four there can be a flow in two flow directions through the pressure-actuated valve 60.

Figure 3:
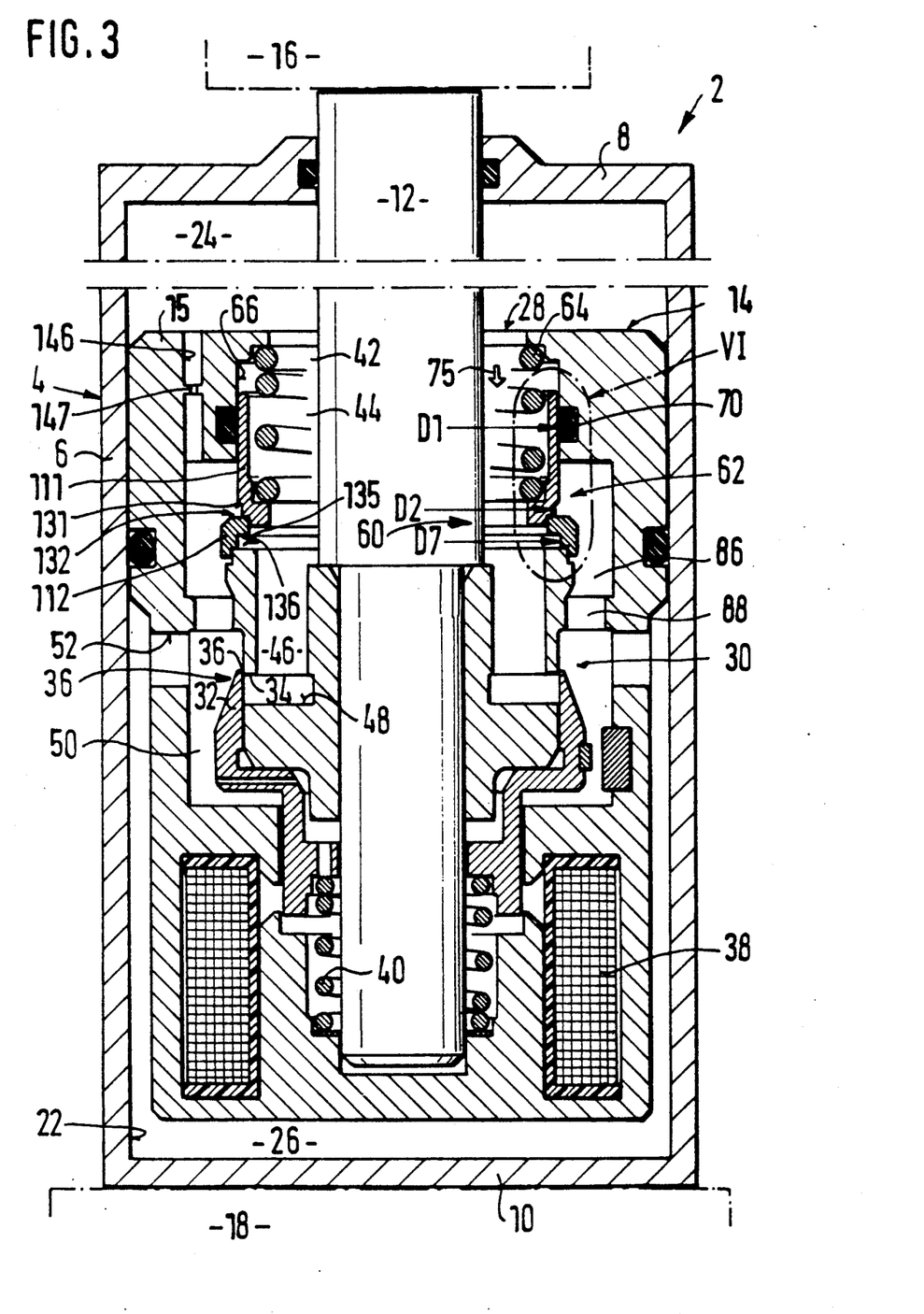

FIG. 3 shows the third exemplary embodiment. Here the valve body 62 includes a first valve body part 111 and a second valve body part 112. Part of the pressure-actuated valve 60 shown in FIG. 3 is marked with a dot-dash line VI. This part of the pressure-actuated valve 60 is shown again on a different scale in FIG. 6 for the sake of clarification.

Figure 6:
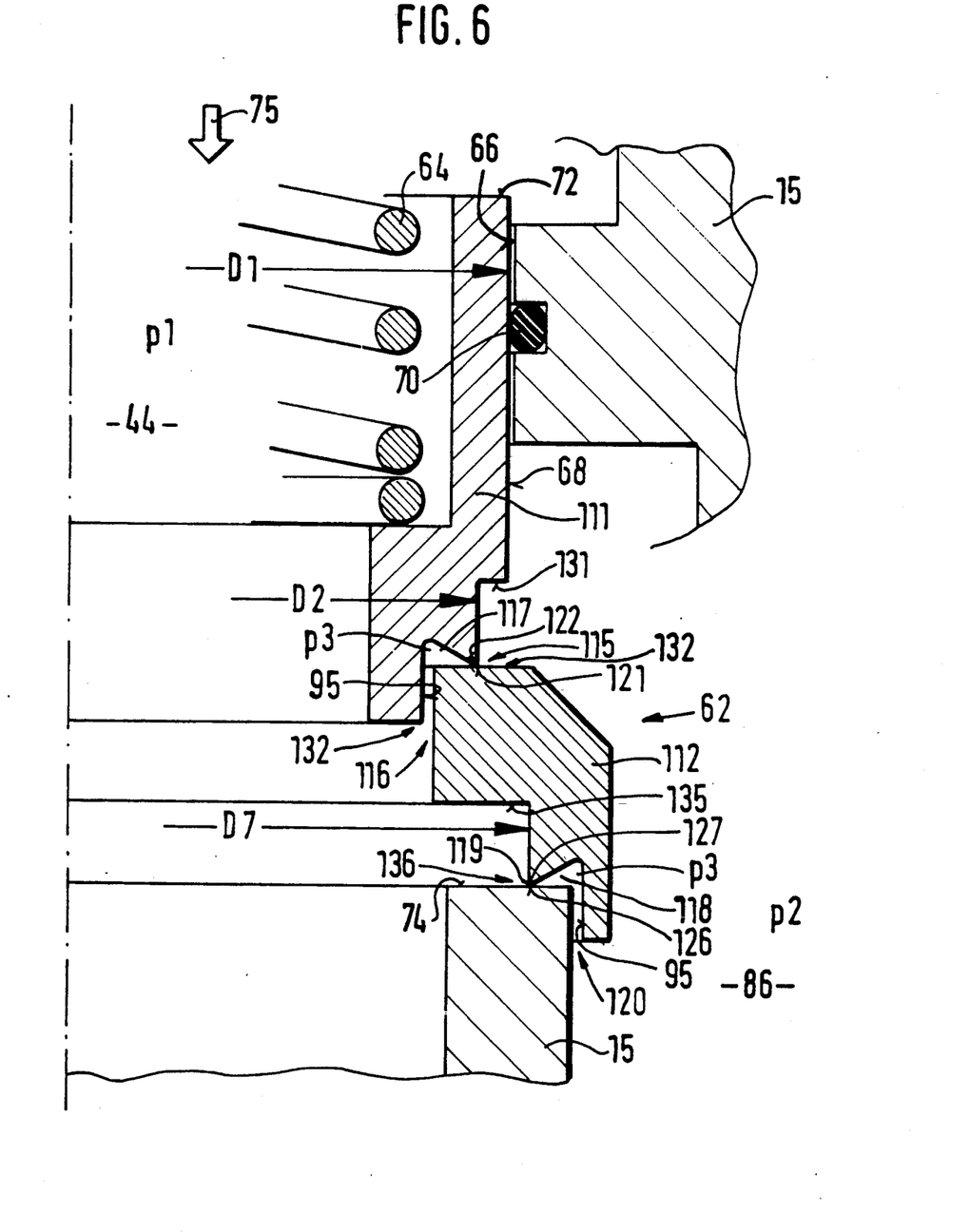

A first sealing location 115 and a first throttle restriction 116 are located between the first valve body part 111 and the second valve body part 112. Between the sealing locations, a first intermediate chamber 117 is formed. A second sealing location 119 and a second throttle restriction 120 are located between the second valve body part 112 and the housing 15. A second intermediate chamber 118 is likewise formed between them. The throttle restrictions 116 and 120 are embodied as shown in FIG. 6. If the pressure-actuated valve 60 is closed, the sealing locations 115, 119 separate the chamber 44 from the chamber 86. The second sealing location 119 has a diameter D7. Once again, the diameter of the first sealing location 115 is identified as D2, and the diameter of the guide jacket 68 of the first valve body part 111 is identified as D1. The diameter D7 of the second sealing location 119 is larger than the diameter D2 of the first sealing location ;15. If the pressure p2 in the chamber 86 is higher than the pressure p1 in the chamber 44, then, because D7 is larger than D2, the second valve body part 112 is forced in the closing direction (arrow 75) toward the stop 74 of the housing 15; that is, if p2 is greater than p1, then the second sealing location 119 is closed.

If the first sealing location 115 is closed, a first valve body sealing region 121 formed as an encompassing edge of the first valve body part 111 comes to rest on a first counterpart sealing region 122, oriented toward the first valve body sealing region 121, of the second valve body part 112. If the second sealing location 119 is closed, then a second valve body sealing region 126, embodied in the form of an encompassing edge having the diameter D7, of the second valve body part 112 rests on a second counterpart sealing region 127 formed at the stop 74 of the housing 15.

The diameter D2 of the first sealing location 115 is smaller than the diameter D1 of the guide jacket 68 of the first valve body part 111 of the valve body 62. A first effective pressure face 131 oriented toward the chamber 86 results on the first valve body part 111 from the difference n area between the face of diameter D1, and the smaller face of diameter D2. Via the pressure face 131, the pressure p2 prevailing in the chamber 86 can act upon the first valve body part 111 in the opening direction (counter to the arrow 75). If the pressure p2 is greater than the pressure p1, then as soon as the difference between the two pressures attains a value dependent on the effective pressure face 131 and on the closing force of the spring element 64, the first valve body part 111 is actuated in the opening direction, as a result of which a first flow opening 132 is uncovered in the region of the first sealing location 115, between the first valve body part 111 and the second valve body part 112. In this case, the pressure p2 in the chamber 86 can be called the inflow-side pressure.

If the pressure p1 in the chamber 44 is higher than the pressure p2 in the chamber 86, or in other words the pressure p1 in the chamber 44 is the inflow-side pressure, then the first flow opening 132 between the first valve body part 111 and the second valve body part 112 is closed, and the pressure-actuated valve 60 operates as if the two valve body parts 111 and 112 were firmly joined together, and beyond a certain pressure difference between the pressure p1 and the pressure p2, only the second sealing location 119 between the second valve body part 112 and the housing 15 can open. The diameter D7 of the second sealing location 119 is large than the diameter D1 of the guide jacket 68 of the valve body 62. The resultant difference in surface areas forms a second effective pressure face 135 oriented toward the chamber 44. Because of the second effective pressure face 135 on the second valve body part 112, the second sealing location 119 between the second valve body part 112 and the housing 15 can open beyond a predetermined differential pressure; as a result, a second flow opening 136 is uncovered between the second valve body part 112 and the housing 15.

Figure 4:
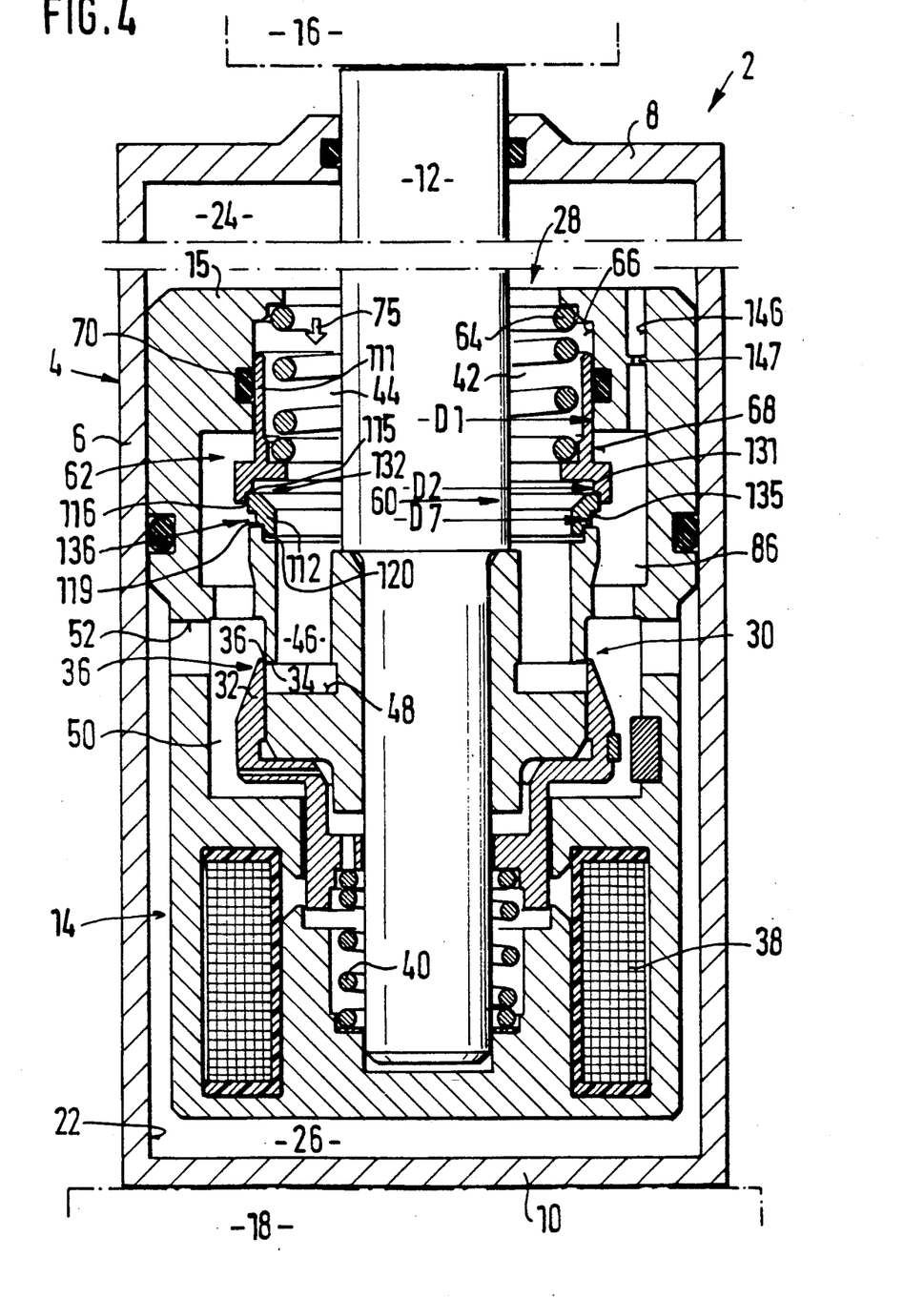

FIG. 4 shows the fourth exemplary embodiment. Here, unlike the third exemplary embodiment (FIG. 3), the diameter D2 of the first sealing location 115 between the first valve body part 111 and the second valve body part 112 is larger than the diameter D1 of the guide jacket 68, and the diameter D7 of the second sealing location 11 between the second valve body part 112 and the stop 74, shown in FIG. 5, of the housing 15 is smaller than the diameter D1 of the guide jacket 6 of the valve body 62. Thus, the first effective pressure face 131 of the first valve body part 111 is oriented toward the chamber 44 in this case, and the second effective pressure face 135 of the second valve body part 112 is oriented toward the chamber 86. Thus, given a corresponding pressure difference, if the pressure p1 in the chamber 44 is higher than the pressure p2 in the chamber 86, the first flow opening 132 is uncovered, and at a corresponding pressure difference, if the pressure p2 of the chamber 86 is higher than the pressure p1 of the chamber 44, the second flow opening 136 between the second valve body part 112 and the housing 15 is opened. Once again, the first throttle restriction 116, in the region of the first flow opening 132 and viewed in the flow direction, is disposed downstream of the first sealing location 115. Once again, again viewed in the flow direction, the second sealing location 119 comes first in the region of the second flow opening 136, followed by the second throttle restriction 120. The first intermediate chamber 117 is located between the first sealing location 115 and the first throttle restriction 116, and the second intermediate chamber 118 is located between the second sealing location 119 and the second throttle restriction 120. Other details, described below in conjunction with FIG. 6, can also logically be applied to the fourth exemplary embodiment.

The exemplary embodiment shown in FIGS. 3 and 4 have the additional advantage that the flow of pressure fluid in the two possible flow directions can be varied. Since in many versions of the shock absorber 2 the pressure fluid flows sometimes from the first work chamber 24 into the second work chamber 26 and sometimes in the opposite direction, the third and fourth exemplary embodiments are especially well suited to a variety of shock absorber embodiments.

In the four exemplary embodiments described in conjunction with FIGS. 1-6, when the valve body 62 is actuated in the closing direction (arrow 75), the flow openings 100, 132, 136 of the various sealing locations 80, 115, 119 are substantially completely closed, because the edge-like valve body sealing region 76, 121, 126 comes to rest on the applicable counterpart sealing region 78, 122, 127. The pressure-actuated valve 60 described in conjunction with FIGS. 1-6 belongs to the category of so-called seat valves. However, it is also possible to embody the valve body 62 or the valve body parts 111, 112 of the valve body 62 in the manner of a slide, which will now be described in conjunction with FIG. 7.

Figure 7:
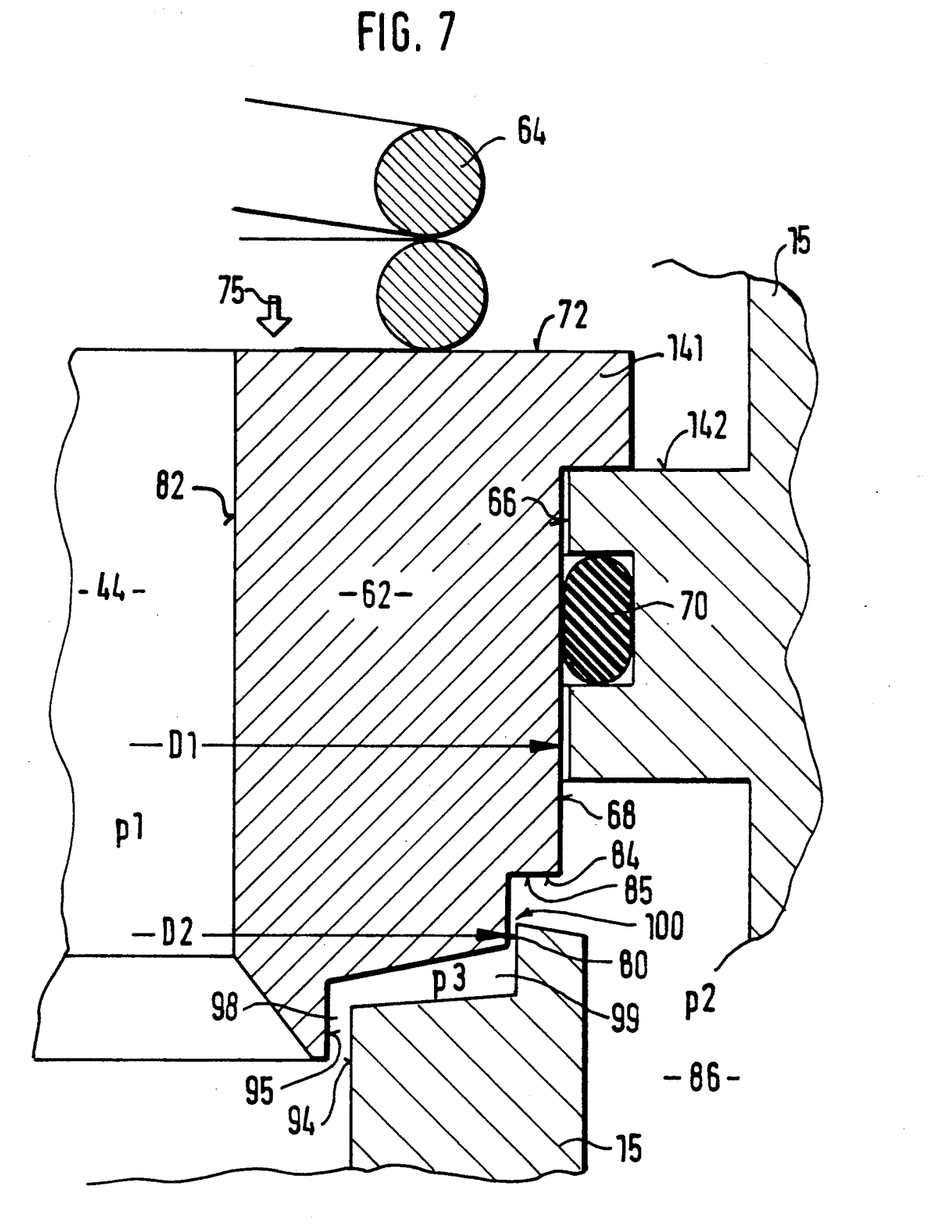

FIG. 7 shows another option for embodying the valve body 62 of the pressure-actuated valve 60 in the region of the flow opening 100 between the valve body 62 and the housing 15. In the variant shown in FIG. 7, the valve body 62 is embodied in the manner of a slide. When the valve body 62 is actuated in the closing direction (arrow 75), a shoulder 141 of the valve body 62 comes to rest on a step 142 of the housing 15 in the closing direction. The valve body 62 embodied as a slide axially covers one edge of the housing 15 in the region of the sealing location 80. This forms an annular gap in the region of the sealing location 80. The annular gap in the region of the sealing location 80 is relatively small, so that a mean diameter of this annular gap can be called the diameter D2 of the first sealing location 80.

In many applications, as for instance is often the case with shock absorbers, it is not absolutely necessary for the sealing location 80 to seal completely. It is merely necessary to make the free cross section of the sealing location 80 small enough that the desired function of the pressure-actuated valve 60 is fulfilled. In order for the intermediate pressure p3 in the intermediate chamber 99 not to become overly high, which might allow the pressure-actuated valve 60 to open too early, the free cross section of the annular gap in the region of the sealing location 80 should be markedly smaller than the annular cross section in the region of the throttle restriction 98. In the pressure-actuated valve 60 part of which is shown in FIG. 7, leakage exists even when the valve body 62 is actuated in the closing direction (arrow 75). Since the cross section of the annular gap in the region of the sealing location 80 is smaller than the cross section of the throttle restriction 98, the pressure in the region of the sealing location 80 drops markedly more sharply than in the region of the throttle restriction 98, so that when the vale body 62 is actuated in the closing direction, largely the same pressure as in the chamber 44 prevails in the intermediate chamber 99.

The pressure-actuated valve 60 shown in part in FIG. 7 can also be modified in such a way that the diameter D2 of the annular gap of the sealing location 80 is larger than the diameter D1 of the guide jacket 68, so that approximately the same conditions then prevail as in the second exemplary embodiment shown in FIG. 2. However, it is also possible to modify the variant shown in FIG. 7 in accordance with the exemplary embodiments described in conjunction with FIGS. 3, 4 and 6 and to divide the valve body 62 into two valve body parts 111, 112, so that the flow of the pressure fluid in both directions can be allowed and thereby influenced with the pressure-actuated valve according to the invention.

The shock absorber 2 may be provided not only with the flow connection 28 having the pressure-actuated valve 60 but also with a further flow connection 146, for instance having a further pressure-actuated valve 147, a shutter, an electromagnetically actuatable valve or the like between the two work chambers 24, 26. A plurality of flow connections 146 may also be provided.

The pressure-actuated valve 60 according to the invention may also be disposed in a flow connection provided not in the damper piston 14 but at some other location inside or outside the shock absorber 2.

The pressure-actuated valve 60 is disposed in the flow connection 28 parallel to the throttle restriction 30 that is controllable via the control slide 32. The pressure-actuated valve 60 will suitably be dimensioned such that in the normal situation the damping force of the shock absorber 2 is controlled solely via the throttle restriction 30, and only in the event of an unusually strong external force that displaces the two masses 16, 18 toward one another will the pressure p1 or p2 suffice to open the pressure-actuated valve 60. Thus the pressure p1 or p2 in the work chambers 24, 26 can be limited to a non-critical value. The unusually strong force displacing the two masses 16, 18 toward one another may for instance arise if the shock absorber 2 is installed in a vehicle between the vehicle body and the vehicle axle and this vehicle drives over a large obstruction at high speed.

The pressure-actuated valve 60 may also, however, be present at the solve valve in the flow connection 28 of the shock absorber 2. In other words, further throttle restrictions, such as the throttle restriction 30 and hence the control slide 32, can then be omitted, and the pressure-actuated valve 60 is the only element monitoring the damping force of the shock absorber 2 of the damping system.

In the exemplary embodiments shown (FIGS. 1-7), the pressure fluid flows substantially radially from the outside inward or from the inside out through the applicable flow opening 100, 132, 136 in the region of the sealing location 80, 115, 119. Before the pressure fluid flows into the chamber 44 or 86 containing the outflow-side pressure, it is diverted to a variable extent in the axial direction, counter to the opening direction, depending upon how the valve body 62 is actuated in the opening direction. The pressure fluid is diverted into the axial direction by the step 95 of the valve body 62 or of the valve body parts 111, 112. Both effects, that is, embodying the intermediate pressure p3 in the applicable intermediate chamber 99, 117, 118 and the deflection of the flow of pressure fluid in the region of the step 95, have the following advantage: If the pressure-actuated valve 60 is closed, only the size of the applicable effective pressure face 85 or 131 or 135 is responsible for the opening of the valve 60. However, as soon as the valve body 62, or one of the valve body parts 111, 112, is moved at least somewhat in the opening direction, the opening force rises. Thus, the increase in closing force of the spring element 64 can be compensated for at least in part, or overcompensated for. It is thus possible to keep the inflow-side pressure constant, for example, regardless of the size of the flow of pressure fluid. Depending on the dimensioning of the valve 60, one or the other will be of greater importance.

A particular advantage is that in all the exemplary embodiments (FIGS. 1-7), at a given inflow-side pressure, the size of the applicable effective pressure face 85, 131, 135 is solely influential for the opening force. The effective pressure face 85, 131, 135 is entirely independent of the particular flow opening 100, 132, 136 that can be opened. In dimensioning the spring element 64, it is largely necessary merely to take into account the size of the applicable effective pressure face 85, 131, 135. For instance, the difference in diameter between D1 and D2, or D1 and D7, and hence the effective pressure face 85 or 131 or 135 can be selected to be small, so that to protect against a high inflow-side pressure a weak and hence small spring element 64 will suffice, yet nevertheless it is possible to open a large flow opening 100, 132, 136.

To keep the friction between the valve body 62 and the housing 15 as low as possible, the sealing element 70 can optionally be dispensed with.

The embodiments of the pressure-actuated valve 60 of FIGS. 3, 4 and 6 have the additional advantage that the flow of pressure fluid in both directions can be influenced with a single pressure-actuated valve 60. Advantageously, only one spring element 64 is necessary to do this. Nevertheless, for instance if the pressure fluid flows out of the first work chamber 24 into the second work chamber 26, the inflow-side pressure, that is, the pressure p1 in the chamber 44 or in the first work chamber 24, can be brought to a high level, and if the pressure fluid flows out of the second work chamber 26 into the first work chamber 24, the inflow-side pressure, that is, the pressure p2 in the chamber 86 or in the section work chamber 26 can be kept quite low. In the exemplary embodiment of FIGS. 3 and 6 which is achieved by providing that the effective pressure face 131 on the first valve body part 111 is selected to be relatively large, and the effective pressure face 135 on the second valve body part 112 is selected to be relatively small.

In the exemplary embodiment of FIG. 4 the same effect is achieved, if for the pressure ratio given as an example the effective pressure face 131 is selected to be relatively small, and the effective pressure face 135 is selected to be relatively large. Thus, the two applicable inflow-side pressures p1 and p2 are controllable independently of one another for blow flow directions.

The pressure-actuated valve 60 is especially well suited for shock absorbers, especially for so-called single-tube shock absorbers, and also for so-called dual-tube shock absorbers.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A bi-directional pressure-activated valve comprising a housing including a first pressure fluid chamber and a second pressure fluid chamber, a valve body actuatable inside said housing in a closing direction and in an opening direction between said first pressure fluid chamber and said second pressure fluid chamber, said valve body includes at least one effective pressure face, a first body part including a first valve sealing region and a second body part including a second sealing region juxtaposed said first valve sealing region which together form a sealing location that divides said first pressure fluid chamber from said second pressure fluid chamber, a spring element, said first valve body part is movable in a closing direction by a closing force of said spring element and is actuatable in an opening direction by an opening force of an inflow pressure fluid flowing into an inflow chamber formed by one of said first and second pressure chambers which inflow pressure fluid is active upon said at least one pressure face of said valve body to actuate said first body part in an opening direction to form a controllable flow opening (100, 132, 136) that determines a fluid flow from said chamber having an inflow pressure fluid to a chamber having an outflow pressure fluid whereby pressure fluid flows from one of said pressure chambers between said first valve sealing region and said second sealing region in either direction depending upon the chamber to which the inflow pressure fluid is directed and from which chamber the outflow fluid pressure is directed.

2. A pressure actuator valve as defined by claim 1, in which a throttle restriction (98, 116, 120) is provided downstream of the sealing location (80, 115, 119) in the flow direction, and upon actuation of the first body part (62, 111, 112) at least partly in the opening direction, an intermediate pressure (p3) that forms between the sealing location (80, 115, 119) and the throttle restriction (98, 116, 120) additionally reinforces the opening force.

3. A pressure actuator valve as defined by claim 2, in which said first body part (62, 111, 112) includes means by which a pressure fluid flowing through the flow opening (100, 132, 136) is deflected substantially into an axial direction in a region of the first body part (62, 111, 112).

4. A pressure actuator valve as defined by claim 3, in which said second valve body part (112) includes a third sealing region, and upon flow of the pressure fluid in one of two flow directions, said controllable flow opening (132) forms between said first valve sealing region and said second valve sealing region of said first and second valve body parts (111, 112).

5. A pressure actuator valve as defined by claim 2, in which said second valve body part (112) includes a third sealing region, and upon flow of the pressure fluid in one of two flow directions, said controllable flow opening (132) forms between said first valve sealing region and said second valve sealing region of said first and second valve body parts (111, 112).

6. A pressure actuator valve as defined by claim 5, in which in one flow direction, said effective pressure face (131) is located on the first valve body part (111), and in the other flow direction said effective pressure face (135) is located on the second valve body part (112).

7. A pressure actuator valve as defined by claim 6, in which each of said effective pressure faces (131, 135) are of different sizes for the two flow directions.

8. A pressure actuator as defined by claim 7, in which the pressure-actuated valve (60) is operative to provide a damping force of a damping system.

9. A pressure actuator valve as defined by claim 1, in which said first body part (62, 111, 112) includes means by which a pressure fluid flowing through the flow opening (100, 132, 136) is deflected substantially into an axial direction in a region of the first body part (62, 111, 112).

10. A pressure actuator valve as defined by claim 9, in which said second valve body part (112) includes a third sealing region, and upon flow of the pressure fluid in one of two flow directions, said controllable flow opening (132) forms between said first valve sealing region and said second valve sealing region of said first and second valve body parts (111, 112).

11. A pressure actuator valve as defined by claim 1, in which said second valve body part (112) includes a third sealing region, and upon flow of the pressure fluid in one of the two flow directions, said controllable flow opening (132) forms between said first valve sealing region and said second valve sealing region of said first and second valve body parts (111, 112).

12. A pressure actuator valve as defined by claim 11, in which in one flow direction, said effective pressure face (131) is located on the first valve body part (111), and in the other flow direction said effective pressure face (135) is located on the second valve body part (112).

13. A pressure actuator valve as defined by claim 12, in which each of said effective pressure faces (131, 135) are of different sizes for the two flow directions.

14. A pressure actuator as defined by claim 13, in which the pressure-actuated valve (60) is operative to provide a damping force of a damping system.

* * * * *